United States Patent [19]

Davis

[11] Patent Number: 4,560,395

[45] Date of Patent: Dec. 24, 1985

[54] COMPACT BLOWER AND FILTER ASSEMBLIES FOR USE IN CLEAN AIR ENVIRONMENTS

[75] Inventor: George B. Davis, Frederick, Md.

[73] Assignee: Environmental Air Control, Inc., Hagerstown, Md.

[21] Appl. No.: 676,917

[22] Filed: Nov. 30, 1984

Related U.S. Application Data

[63] Continuation-in-part of Ser. No. 601,398, Apr. 17, 1984, abandoned.

[51] Int. Cl.$^4$ ............................................. B01D 46/00
[52] U.S. Cl. .................................. 55/276; 55/385 A; 55/473; 98/33.1; 98/39.1; 415/119
[58] Field of Search ...................... 55/276, 483, 385 A, 55/467, 470–473; 98/33 R, 39; 415/119

[56] References Cited

U.S. PATENT DOCUMENTS 4,319,899  3/1982  Marsh .................................. 55/473
4,344,784  8/1982  Deckas et al. ..................... 55/385 A

FOREIGN PATENT DOCUMENTS 615359   7/1935  Fed. Rep. of Germany ........ 55/276
2925845  1/1980  Fed. Rep. of Germany ...... 415/119

Primary Examiner—Bernard Nozick
Attorney, Agent, or Firm—Dowell & Dowell

[57] ABSTRACT

Compact centrifugal fan and filter assemblies for use in providing laminar flow clean air to a work space environment such as those within clean rooms and clean air work stations or cabinets wherein the fan and filter element are mounted in a close physical relationship with respect to one another and within a common plenum chamber and wherein the fan creates an airflow which is initially generally parallel with respect to the filter element and which is thereafter channeled by baffle members so as to provide uniform air pressure and airflow across the filter element while reducing vibration and increasing the air flow rate from the fan and filter assemblies to such clean air environments.

24 Claims, 9 Drawing Figures

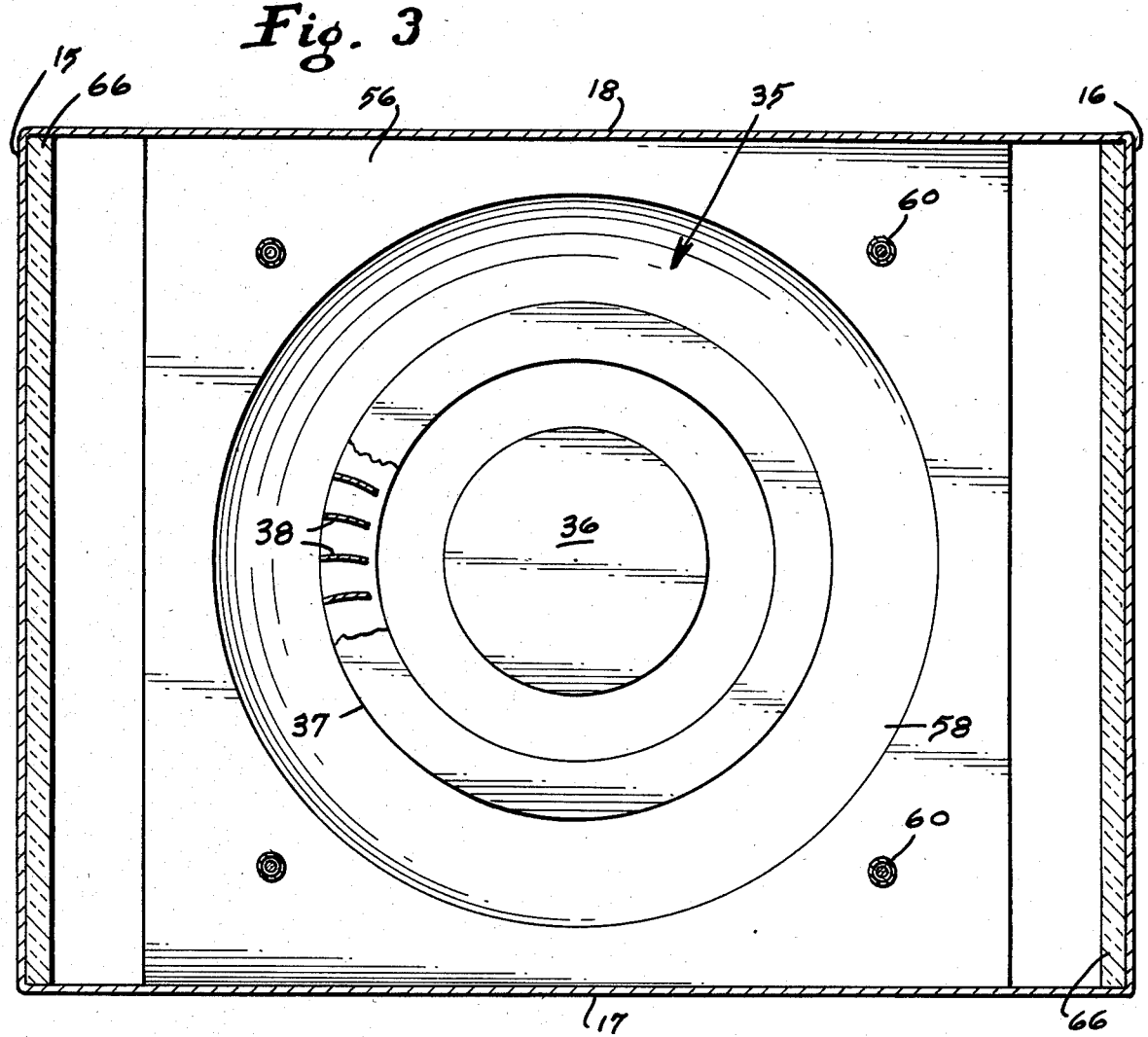
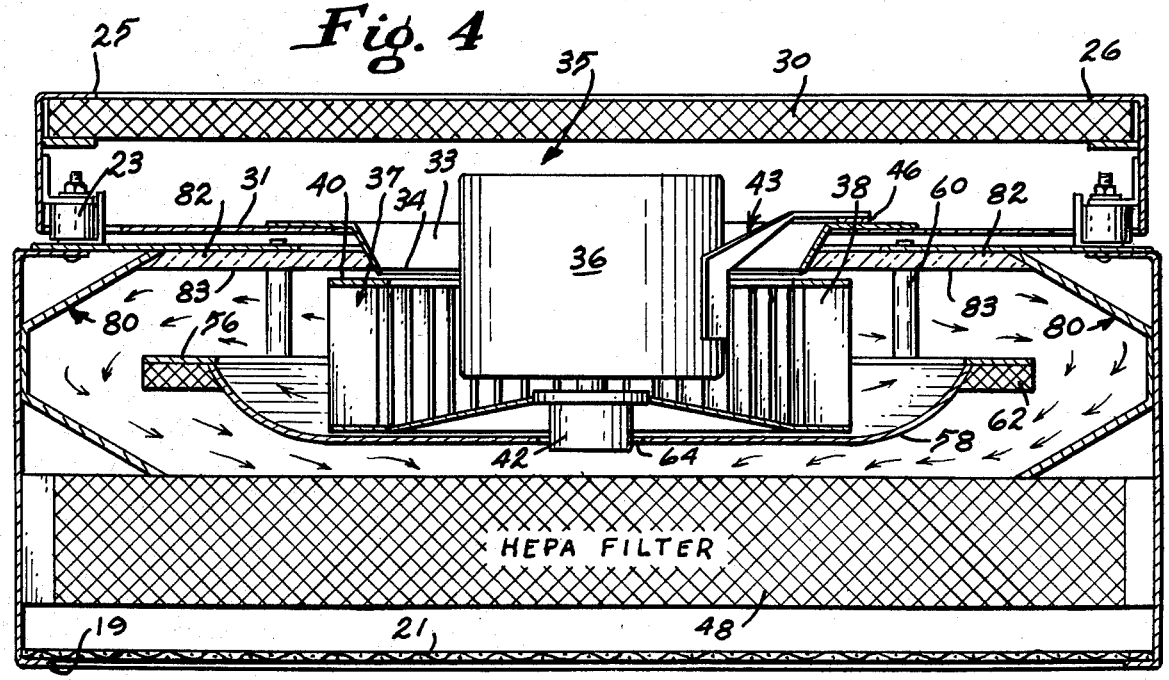

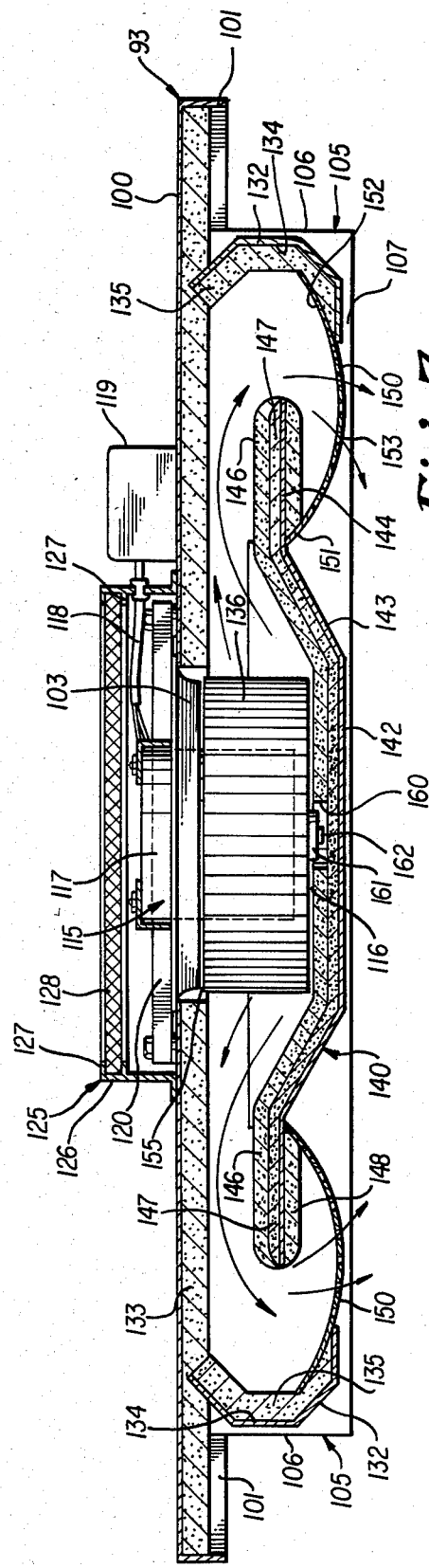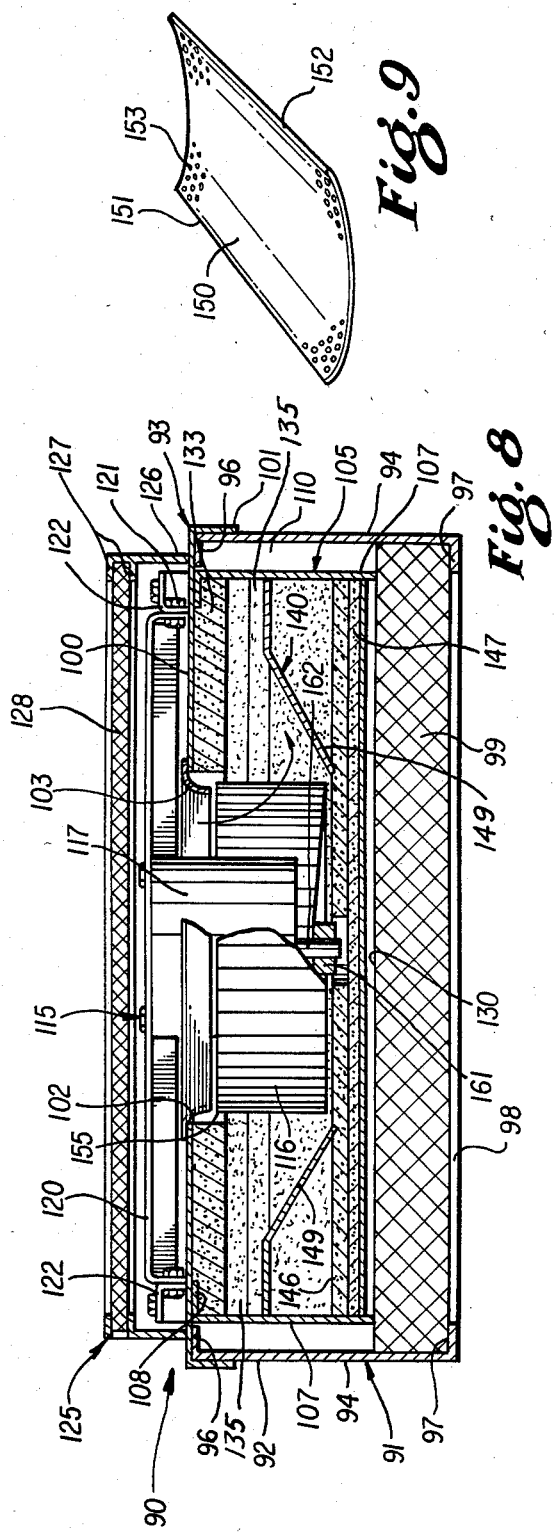

COMPACT BLOWER AND FILTER ASSEMBLIES FOR USE IN CLEAN AIR ENVIRONMENTS

BACKGROUND OF THE INVENTION

Cross Reference to Related Applications

The application is a continutation-in-part application of Ser. No. 601,398, filed Apr. 17, 1984 for a Compact Blower and Filter Assembly, by the same inventor now abandoned.

FIELD OF THE INVENTION

This invention is generally directed to blower and filter assemblies for introducing a filtered airflow to enclosed environments and particularly to compact blower and filter assemblies which are adapted for use in providing laminar flow clean air in compliance with government standards into work space environments such as those in clean rooms and clean air work stations where the fan and filter elements are mounted within a common plenum chamber in close physical proximity to one another in order to make each unit more compact and wherein baffle members are provided for distributing and channeling the air passing from the fan across a HEPA filter element so that the air passing from the units or assemblies is classifiable as a Class 100 air moving at flow rates of approximately 90 feet per minute (plus or minus 10 feet per minute) and at a static pressures of 0.5 inch to 1.3 inch water gauge.

HISTORY OF THE PRIOR ART

The field of Clean air technology is rapidly growing with clean air systems and/or environments being developed in a number of forms. Static or integrated systems are designed and incorporated into structures or buildings to provide for purification of air within the work space of such structures. As an alternative, quick assembly modular clean air rooms have been developed which may be installed within an existing room or building to provide separate clean air spaces within such buildings without requiring modification to the existing physical structure. For smaller areas, clean air work stations have been developed which provide counter height work enclosures having clean air laminar flow of filtered air continuously circulating therethrough.

No matter what application or form of clean air environment is utilized, the air being introduced into the environment must be maintained in a purified state to both protect against sample and specimen contamination and to prevent the release to the surrounding environment of various hazardous agents, chemicals, and the like. In an effort to insure safety and quality within clean air environments and clean air work stations, the federal government has set down a plurality of regulations which must be met in order for a system to be utilized in a safe capacity as a clean air environment.

There are presently numerous clean air work stations and modular clean air rooms and forced air systems which do meet federal standards for providing a clean air flow which will protect people as well as the surrounding environment from accidental contamination. There are other problems, however, with existing clean air systems. Available systems including clean air work stations are bulky and costly due to the size of the components which have been utilized to maintain adequate airflow and air purification. The larger the components of a system, the greater the expense to house, ship and handle the system.

In conventional clean air work stations and modular clean rooms, air is generally circulated by a centrifugal fan or blower unit which is mounted within a shroud adjacent the rear or top of a filter chamber. Air is directed from the blower unit or housing into the filter plenum where the air passes through HEPA filters. Particles of 0.3 microns and larger are removed from the air passing through the HEPA filters. As mentioned, conventional clean air blower and filter units are generally excessively large as the blower units are either mounted within a separate housing upstream of the filter plenum chambers or because the blower units, which normally include centrifugal fans, are mounted so that the discharge from the blower fans is in the direction of airflow.

As many clean room systems take the form of either work stations or modular clean rooms, the more compact the components of such stations or rooms can be made, the more inexpensive, easily handled and constructed such systems will be. Further, if the filtration and circulation elements of clean air systems can be more efficiently and compactly housed, then the effective size of the work space can be increased without changing the overall sizes of the systems.

SUMMARY OF THE INVENTION

Compact blower and filter assemblies for use in clean air environments wherein the blower fans are mounted without a shroud within the uppermost portion of the filter plenum chamber. The fan assembly is mounted so that air passing into the filter plenum chamber is directed radially outwardly with respect to the plane of a HEPA filter element which is mounted downstream of the fan and thereafter guided by baffle members so as to be distributred across the upstream face of the HEPA filter element. A prefilter may be removably placed adjacent the intake side of the plenum chamber to initially remove large particulates from the air before the air passes into the intake of the fan unit. The centrifugal fan is mounted so that the radially extending blades direct air outwardly at a point immediately adjacent the interior edge of the opening into the intake side of the plenum chamber. Interior baffle members direct the air outwardly and downwardly. The fan is partially disposed within an intermediate baffle member which separates the fan from the HEPA filter element. The intermediate baffle element prevents air from reentering the fan after it has been forced outwardly toward the sides of the plenum chamber.

In a preferred embodiment of the invention, the lower baffle member includes upwardly and outwardly extending insulated wall portions which direct the airflow toward baffle members located at opposite sides of the filter plenum chamber. The airflow is subsequently directed by the side baffle members through slotted screens toward the HEPA filter element.

It is the primary object of this invention to provide blower and filter assemblies for use with clean air environment equipment so as to provide laminar flow of Class 100 clean air in very compact enclosures as compared with more conventional blower and filter assemblies.

Another object of this invention is to provide blower and filter assemblies for use in clean air environments wherein the blowers and filters are mounted within common plenum chambers. Air flow rates of approximately 90 feet per minute may be readily obtained using squirrel cage type centrifugal fans which are mounted to discharge air generally parallel with respect to the face of the filter elements. The air directed by the fans moves radially outwardly immediately adjacent the upper inner edges of the plenum chambers and lower baffle members partially surround the fan units extending not more than approximately two-thirds of the height of the fan blades toward the upper end of the plenum chambers to thereby prevent the recirculation of air into the fan blades and to assist in directing air across the downstream filter elements.

It is another object of the present invention to provide blower and HEPA filter assemblies for use in clean air environments which can provide Class 100 laminar flow air at rates of 90 feet per minute wherein the total height or depth of the assemblies, from intake to discharge, is significantly reduced with respect to the known prior art fan and filter arrangements for clean air environments.

It is yet another object of the present invention to provide blower and filter assemblies for use in clean air environments which provide air at federally regulated standards and within commercially acceptable noise levels while maintaining constant pressures and uniform flow rates across the filter elements.

It is a further object of this invention to provide compact blower and filter assemblies for use in clean air environments wherein the size of the assemblies will enable equipment incorporating such assemblies to be more space efficient, easier to ship or deliver and more inexpensive to manufacture.

BRIEF DESCRIPTION OF THE DRAWINGS

FIG. 3 is a cross-sectional view taken along 3—3 of FIG. 2 showing portions of the upper surface of the fan broken away.

FIG. 4 is a cross-sectional view similar to that shown in FIG. 2 with the mounting of the HEPA filter shown in a modified form.

FIG. 7 is a partial cross-sectional view taken along lines 7—7 of FIG. 5 showing only the lid, fan and baffle portions of this embodiment.

FIG. 8 is an enlarged cross-sectional view having portions broken away. Taken along lines 8—8 of FIG. 5.

FIG. 9 is a prespective view of an air screen used in the embodiments of FIGS. 5-8.

DESCRIPTION OF THE PREFERRED EMBODIMENT

Figure 1:
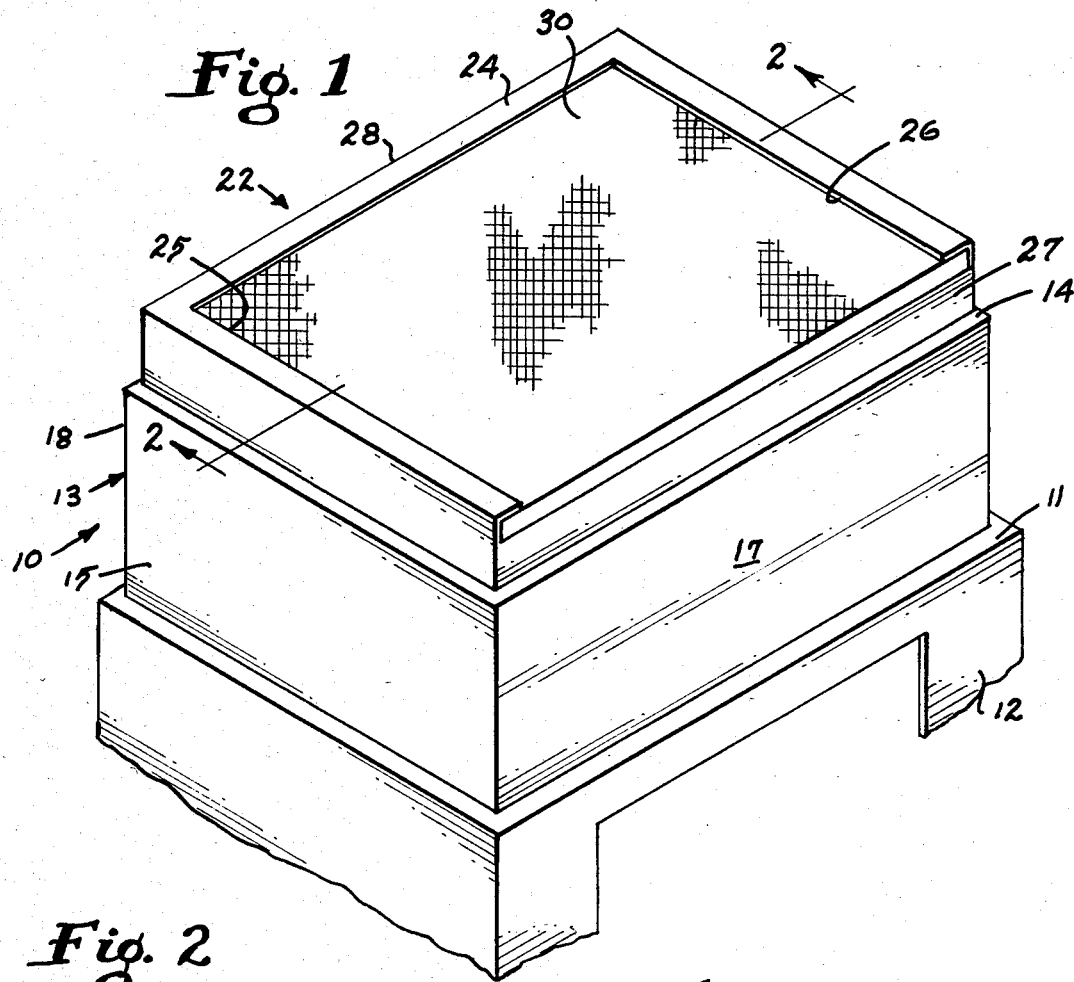
FIG. 1 is a perspective view illustrating one form of blower and fan assembly as it is shown mounted to the upper portion of a clean air work station in order to provide a vertical flow of air downwardly into the work station.

With continued reference to the drawings a first embodiment of the compact blower and filter assembly 10 of the present invention is shown as it is mounted to the top 11 of a conventional clean air work station 12. The blower and filter assembly provides a source of clean air supply into the interior of the work station. The blower and filter assembly includes a filter plenum chamber 13 having an upper surface 14 and rectangularly oriented sidewalls 15, 16, 17 and 18. The lower portion of the plenum chamber 13 is generally open at 20 and includes an inwardly directed peripheral flange 19. The lower opening 20 is covered by a screen 21 so as to prevent the passage of objects upwardly into the plenum chamber.

Figure 2:
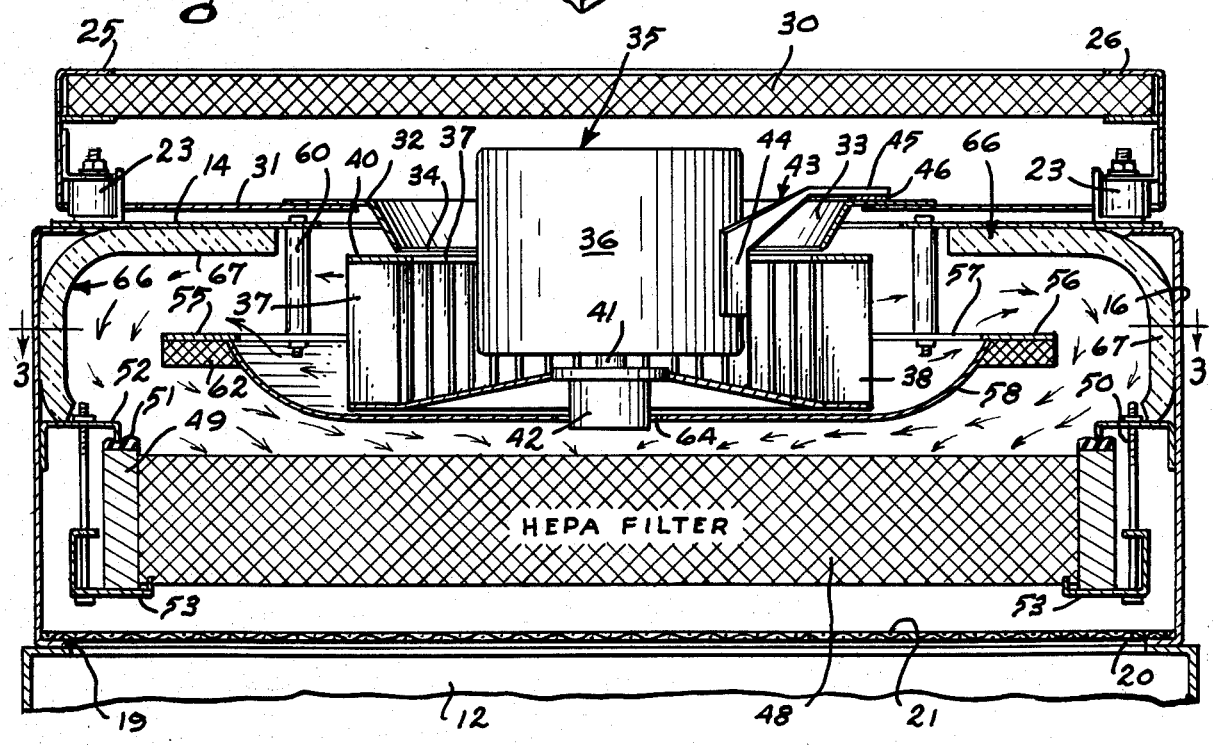
FIG. 2 is a cross-sectional view taken along lines 2—2 of FIG. 1.
Figure 5:
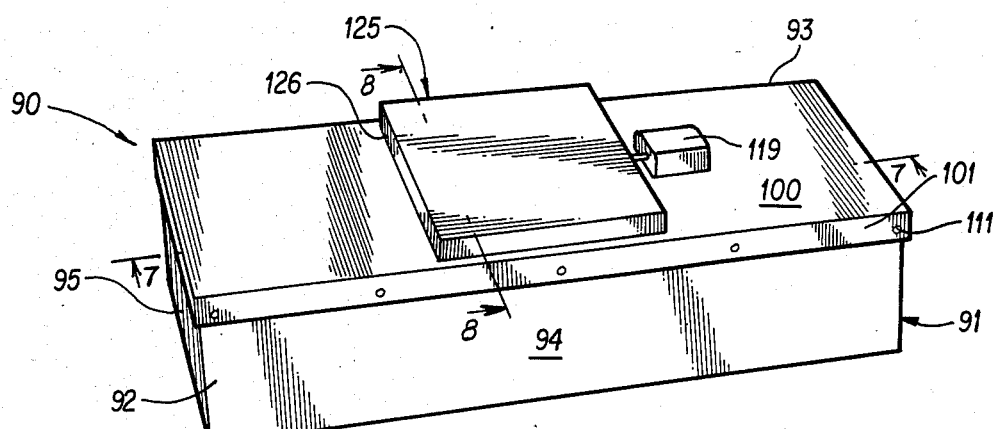
FIG. 5 is a perspective view of a preferred embodiment of blower and filter assembly made in accordance with the present invention.

A prefilter assembly 22 is mounted in sealed engagement to the upper surface 14 of the plenum chamber by vibration dampening connectors 23. The upper portion 24 of the prefilter assembly 22 is opened to permit airflow therethrough. A pair of spaced opposing channel member 25 and 26 extend from the front 27 to the rear 28 of the prefilter chamber on opposite sides of the opening as shown in FIG. 2. A conventional filter element 30 such as a washable polyurethane foam is slidably received within the opposed channels and thereby serves as a prefilter for collecting larger airborne particles.

With further reference to FIG. 2, the lower wall 31 of the prefilter chamber is provided with a generally circular opening 32. A generally conically shaped baffle 33 is welded or otherwise secured within the opening 32. The sidewalls of the baffle taper inwardly forming a generally circular second opening 34 at a point below the upper surface 14 of the plenum chamber 13.

In order to draw air into the plenum chamber 13, a blower unit 35 is mounted within the opening 34 between the prefilter chamber and the filter plenum chamber. The blower unit 35 includes a motor 36 and squirrel cage type centrifugal fan 37 having a plurality of radially extending slightly curved blades 38 which are mounted adjacent the outer periphery of the fan. The fan is drivingly connected to the motor drive shaft 41 and is retained thereon by locking hub 42. The motor is mounted to the lower wall or surface 31 of the prefilter chamber by a plurality of brackets 43 which are attached at one end 44 along the length of the motor housing and extend outwardly therefrom to a second end 45 which is secured to the lower wall of the prefilter chamber. A vibration dampening element 46 may be provided between the bracket 43 and the lower wall of the prefilter chamber.

A conventional HEPA filter 48 is mounted below or downstream of the blower assembly so as to filter air being forced therethrough by the blower fan. The HEPA filter is mounted within a frame 49 and retained in sealed engagement with the interior sidewalls of the plenum chamber 13 by elongated mounting clamps 50. As shown, the upper surface of the filter frame 49 includes a resilient gasket 51 which is engaged by the upper portion 52 of the adjustable mounting clamps 50. The gasket and upper portion of the mounting clamp prevent air passage around the filter so that all air is passed through the HEPA filter element 48 and purified before entering the clean air environment located below the blower and filter assembly. The upper portions 52 of the clamps are welded or otherwise secured to the walls of the plenum chamber and the lower portions 53 of the clamps are adjustably carried by adjusting screws 54. The lower portion of the filter frame is securely supported on the lower portions of the clamp.

The fan 37 is mounted perpendicularly with respect to the axis which extends centrally of the blower and filter assembly 10. In this manner, air is drawn by the fan through the prefilter element and through opening 34 and thereafter directed outwardly toward the sides of the plenum chamber 13. As shown by the arrows in FIG. 2, the air is thereafter directed inwardly toward the center of the plenum chamber and passes through the HEPA filter element.

In order to improve the efficiency and air flow characteristics of the blower and filter assembly, an intermediate baffle assembly 55 is mounted between the fan and filter element. The intermediate baffle assembly includes a generally planar plate member 56 which extends between the side walls 17 and 18 of the plenum chamber. An opening 57 is provided in the central portion of the plate member and a dish shaped baffle plate 58 is fitted over the opening and welded or otherwise secured to the underside of the plate member 56. The intermediate baffle assembly is suspended in position between the fan and the HEPA filter by means of elongated mounting bolts 60 which are encased in vibration dampening sleeves. The bolts connect the plate member 56 with the upper wall 14 of the plenum chamber.

In order to reduce vibration and noise within the plenum chamber, a sound insulating or dampening material 62 is adhesively secured to the underside of the plate member 56. A central opening 64 may also be provided within the central portion of the dish shaped member 58 through which the hub 42 of the motor may extend so that fan and lower baffle members are more compactly situated within the plenum chamber.

The air flow through the plenum chamber is further improved by providing side baffles 66 which will function to direct the airflow generally in an arcuate fashion downwardly and inwardly towards the HEPA filter element. In FIG. 2, the side baffles are shown as being generally C-shaped vibration dampening elements 67 which are adhesively secured to the lower surface of the upper wall 13 of the filter plenum chamber and which extend arcuately outwardly to engagement with the sidewalls 15 and 16 and vertically there along curving inwardly again at their lower ends. Therefore, the baffle elements 67 provide continuous arcuate surfaces to direct air flow away from the sidewalls. Although the baffle members shown in FIG. 2 are composed of a sound dampening material, the side baffles may be formed of metal or plastic shaped to cause the airflow to be directed between the intermediate baffle assembly and the filter element.

During the operation of the fan, air is forced in the direction shown by the arrows in FIG. 2 and directed slightly upwardly by the dish shaped baffle element and outwardly. The side baffle elements direct the air inwardly and downwardly toward the HEPA filter. It should be noted that the curved sidewalls of the dish shaped baffle member extend upwardly to not more than approximately two-thirds the height of the fan blades 38. The purpose of the dish shaped baffle member is to prevent the air which has impacted against the sidewalls and side baffle members of the plenum chamber from being directed back against the lower portion of the fan blades thereby causing a negative back pressure on the fan. The sidewalls of the intermediate baffle should curve or extend outwardly with respect to the fan blades so that the flow of air directed thereby will not be interrupted or stopped. Therefore, no rim or flange should be associated with the intermediate baffle which would extend inwardly of the dish shaped member and generally perpendicularly or acutely with respect to the axis of the fan. The side C-shaped baffle members serve to further increase the positive pressure and stabilize the air flow rate by directing the air flow downwardly away from the fan blades and across the HEPA filter.

Through testing it has been determined that the vertical fan blades must be oriented so that the uppermost portions thereof 40 are generally in line with the lower most inner portion of the upper wall of the plenum chamber 13 or the lower surface of any inwardly extending element attached thereto. In this regard, as shown in FIG. 2, the upper portions of the fan blades are aligned with the inner surface of the sound dampening material 67 which forms the side baffles 66. If the fan blades are mounted slightly above the sound dampening material 67 which is fixed to the upper wall of the plenum chamber, a back pressure would be developed by the air being deflected by the edge thereof back toward the fan blades. This back pressure would cause a reduction in the air flow rate. Also, if the fan blades are mounted at a distance below the lower surface of the upper wall of the plenum chamber, the vertical height of the plenum chamber is unnecessarily increased.

With specific reference to FIG. 4, a modification to the embodiment of the invention of FIGS. 1–3 is shown. In this modification, the HEPA filter element is directly secured, such as by adhesive, to the inner walls of the plenum chamber along the lower portion thereof. As the filter is directly secured to the sidewalls of the plenum chamber, there is no need to provide the adjustable mounting clamps 50 shown in FIG. 2, and thus the filter element may be secured in closer proximity to the fan and the entire plenum chamber reduced in vertical height. Therefore, this embodiment of the invention is even a more compact structure than that of the embodiment shown in FIG. 2.

In the modified embodiment of the invention shown in FIG. 4, replacement of the HEPA filter may be accomplished by disposing of the entire plenum chamber housing after the fan, motor and prefilter assembly have been removed therefrom. Such a disposable filter unit would make replacement of the HEPA filter unit more easily accomplished and less time consuming than would be possible using the embodiment shown in FIG. 2. In addition, by having the filter positively sealed to the sidewalls of the plenum chamber there is no air leakage therebetween and thus air flowing through the chamber must always pass through the HEPA filter element.

In addition to the change in the filter mounting disclosed in the modification of FIG. 4, the arcuate side baffle members 66 have been changed and a varied configuration of side baffle members 80 are secured by welding or other means to the sidewalls of the plenum chambers. The side baffle members 80 are shown as being C-shaped in cross section and are fabricated of either metal or plastic material. As shown by the arrows the air leaving the fan is directed radially outwardly toward the baffle members 80 where the air is further directed between the dish shape baffle member and the HEPA filter element.

As in the preferred embodiment, the embodiment shown in FIG. 4 may include a sound dampening material which is placed along the inside of the upper wall of the plenum chamber as shown at 82. The upper portion of the fan 40 is aligned with the inner face 83 of the dampening material so that no adverse air turbulence is created as previously discussed. If the dampening material is not used, the upper edge of the fan would be generally aligned with the inner edge of the conical baffle 33 defining the opening 34 into the plenum chamber or the inner face of the upper wall 14.

With particular reference to FIGS. 5-9, a preferred embodiment of the invention is disclosed. Unlike the structures of the previous embodiments, the present embodiment for a compact blower and filter assembly 90 includes a plenum chamber 91 having a lower body portion 92 and a removable upper covering or lid portion 93. The blower and filter assembly 90 is designed to be mounted to the upper surface of a clean air work station, such as described with respect to the first embodiment, or may be mounted within a ceiling in order to direct purified air into a clean air room.

The body portion 92 of the plenum chamber 91 includes a generally rectangular frame having first and second pairs of opposing side walls 94 and 95 respectively. Each of the side walls of the body portion of the plenum chamber have upper and lower inwardly extending flanges as shown at 96 and 97. A large air discharge opening 98 is defined by the lower inwardly extending flanges 97 of the sidewalls. In order to purify air passing through the plenum chamber, a HEPA filter 99 is adhesively secured within the side walls 94 and 95 so as to be in sealed engagement therewith. In this manner, all air passing through the chamber must pass through the HEPA filter element.

With particular reference to FIGS. 7 and 8, the covering or lid portion 93 of the plenum chamber includes an upper generally rectangular wall member 100 having downwardly extending flanges 101 extending from the periphery thereof. A generally circular opening 102 is provided in the central portion of the upper wall and an annular inwardly tapering collar member 103 is positioned therethrough and is welded or otherwise secured along its outermost portions thereto. The collar member 103 forms an air inlet opening 104 into the plenum chamber.

A generally rectangular baffle supporting frame member 105 is supported in outwardly extending relationship to the upper wall 100 of the lid 93 and includes two pairs of opposing and generally parallel side walls 106 and 107 respectively. Each of the side walls 106 and 107 include flanged end portions 108 which are welded or otherwise secured to the upper surface or wall 100. Generally, the size of rectangular baffle supporting frame member 105 is somewhat smaller that that of the rectangular frame members of the body portion of the plenum chamber so that an air space is created therebetween as shown at 110. The upper wall of the lid, however, is of a size to insure that the flange portions 101 extend along the outer surfaces of the side walls of the body portion of the plenum chamber and in generally abutting engagement therewith. The lid is secured to the side walls of the body portion of the plenum chamber by use of screws or similar releasable fasteners 111 which pass through the flange portions 101 of the lid and into the plenum side walls 94 and 95.

In the present embodiment, a blower unit 115 is mounted within the opening 104. The blower unit includes a centrifugal fan 116 and a motor 117. The fan and motor are generally structurally the same as the fan 37 and motor 36 described with respect to the embodiments shown in FIGS. 1-4. The motor 117 is connected to a source of electricity through a power cord 118 and junction box 119. The blower unit is suspended from the lid 93 by being secured to a pair of parallel mounting brackets 120 which are mounted to the lid by any suitable means. In FIG. 8, the brackets 120 are shown as being connected by threaded fasteners 121 to a pair of spaced flanges 122 which are welded or otherwise secured to the lid 93.

A prefilter assembly 125 is mounted to the upper portion 100 of the lid 93 above the blower assembly 115. The prefilter assembly includes imperforate side wall portions 126 which are welded or otherwise secured to the upper surface 100 of the lid 93. Each of the side wall portions 126 has a pair of spaced inwardly extending flange members 127 extending inwardly from the upper portion thereof so as to support a prefilter element 128 therein. As with the prefilter assembly 22 of the initial embodiment, air being drawn by the fan into the compact blower and filter unit will initially pass through the filter element 128 which may be constructed of a washable polyurethane foam and which serves as a prefilter for collecting large airborne particles.

As with the prior embodiments of the invention, the interior of the compact blower and filter unit is designed to direct the airflow therethrough in such a manner as to equally distribute the airflow along the face of the HEPA filter element 99. Due to the mounting of the fan 116 within the upper portion of the plenum chamber, the air being introduced therein will be forced outwardly in gererally parallel relationship with the upstream side or face 130 of the HEPA filter 99. In order to direct the air downwardly and to evenly distribute the airflow with respect to the HEPA filter, a pair of generally C-shaped side baffle members 132 are provided in opposing relationship with each other adjacent the sides of the plenum 106. The ends of the side baffle members are welded or otherwise secured to the parallel side walls 107 which extend downwardly from the lid 93. With particular reference to FIG. 7, the side baffle members 132 have an upper portion which extends into a sound dampening material 133 which is adhesively secured to the underside of the upper wall 100 of the lid 93. In addition, the inner face 134 of each baffle member has a sound dampening material 135 attached thereto. It should be noted that the insulating or sound dampening materials 133 and 135 form a generally continuous surface which extends outwardly from the fan 116 and downwardly and subsequently inwardly with respect to the upper surface 130 of the HEPA filter 99.

Figure 6:
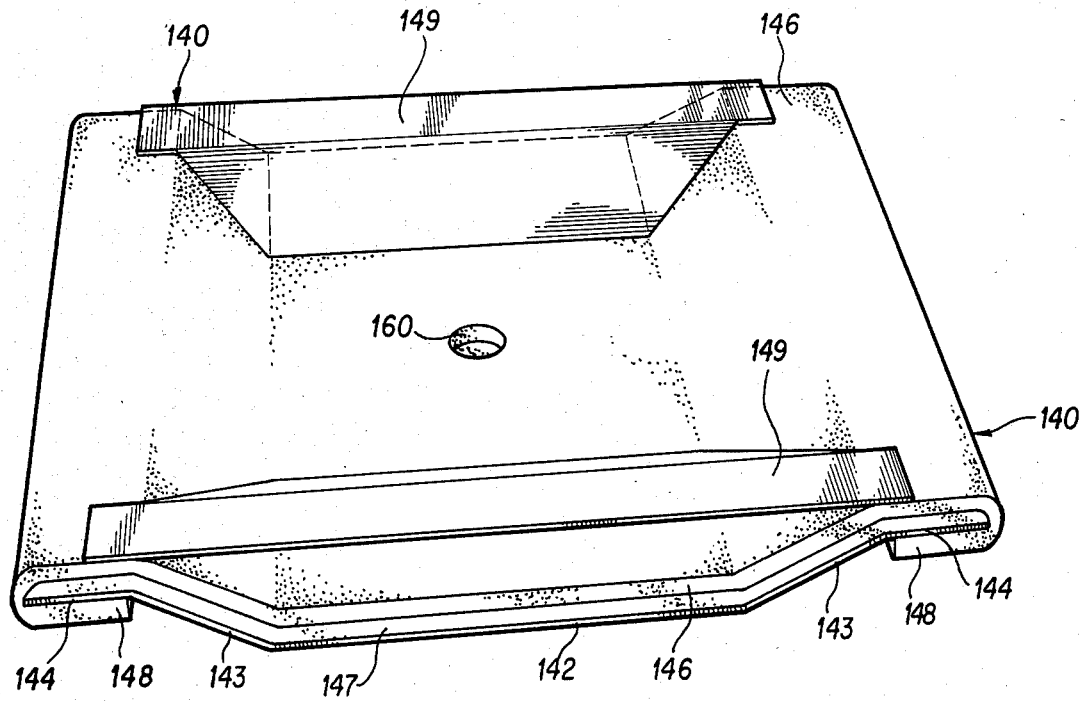
FIG. 6 is a perspective view of the lower air baffle assembly of the embodiment of invention shown in FIG. 5.

In order to prevent any back pressure against the fan blades 136 by the air being deflected by the side baffles 132, an intermediate baffle member 140 is mounted to the side walls 107 of the lid 93 so as to be intermediate the fan 116 and the HEPA filter 99. The details of the intermediate baffle member are shown in FIG. 6. The intermediate baffle member includes a lower generally planar wall portion 142, upwardly extending side wall portions 143 and outer flange portions 144. It should be noted that the bottom wall portion extends generally the width of the fan member 116 and that the upwardly extending side wall portions 143 extend upwardly to a height which should not exceed approximately two-thirds the height of the blades 136 of the fan. The outer flange portions of the intermediate baffle member extend outwardly toward the side wall baffle members 134 terminating in spaced relationship thereto in order to provide an air flow path therebetween.

To reduce the operating noise level of the compact blower and filter unit, the intermediate baffle member is provided with several layers of sound dampening material 146 and 147 which are adhesively secured along the full length and width thereof. Sound dampening materials are also adhesively secured along the lower surface of the outwardly extending flange portions 144 as shown at 148. As with the previous embodiments, the outwardly extending flange portions of the intermediate baffle member will prevent the airflow from reentering the fan blades causing a negative back pressure and additional turbulence in the area of the fan.

The intermediate baffle member is also provided with a pair of side wall insert members 149 which are supported in opposing relationship between the upwardly extending wall portions 143. The baffle insert members serve to provide impervious side walls to prevent any airflow from passing laterally with respect to the flange portions 144. As shown in the drawings, the side baffle inserts 149 are secured over the sound dampening material which cover the intermediate baffle member.

To further diffuse the air which is passing between the intermediate baffle member and the side baffle members, a pair of elongated generally concave porous air screens 150 are mounted between the intermediate baffle member and the side baffle members. As shown in FIG. 7, one elongated edge 151 of the screens is secured to the under side of the intermediate baffle member adjacent the junction between the upwardly extending side wall portion and the outwardly extending flange portion thereof. The other edge portion 152 of the screen is supported by the lower most surface portion of the side baffle members. A plurality of openings 154 are provided in spaced relationship throughout the area of the diffuser screen so as to permit airflow therethrough.

As with the previous embodiments, it is important that the fan 116 be properly mounted within the plenum chamber of the compact blower and filter unit. In this regard, the upper edge of the fan 152 should generally be aligned with the inner surface of the insulating material 133 which is secured to the underside surface of the lid 93. In this manner, there will be no negative air flow created by air being directed against the side of the sound dampening material 133.

Due to the compactness of the blower and filter unit, it is necessary that an opening 160 be provided through the upper layer of sound dampening material 147 so as to permit the locking hub 161 of the fan drive shaft 162 to be disposed therein.

The operation of the preferred embodiment of compact blower and filter unit is similar to that discussed with respect to the previous embodiments. When the fan is activated, air is pulled through the prefilter element 128 where larger particles are removed. The air then passes through the funneled opening 103 into the centrifugal fan 116. Airflow from the centrifugal fan generally follows the arrows shown in FIG. 7 with the air passing outwardly toward the side walls 106 of the lid 93. The air is slightly deflected upwardly by the intermediate baffle member 140 and toward the side baffle members 134 where upon the air is redirected downwardly through the air diffuser panels 150. As the air passes through the air diffuser panels, the airflow is directed across the entire area of the upper surface 130 of the HEPA filter element 99 so that a uniform flow of air passes therethrough.

I claim:

1. A compact air purification apparatus for providing clean airflow to a clean air enclosure comprising a primary housing having first and second end portions and substantially closed sidewall portions, inlet and discharge openings disposed through said first and second end portions, respectively, a blower means mounted through said inlet opening so as to extend inwardly of said primary housing, said blower means having a motor drivingly connected to a centrifugal fan means, said centrifugal fan being disposed within said primary housing so as to discharge air radially outwardly with respect to said inlet opening, said centrifugal fan including a plurality of radially extending blade means, a filter means mounted within said primary housing adjacent said discharge opening so that all airflow outwardly of said primary housing through said discharge opening passes through said filter means, a first baffle means disposed adjacent said centrifugal fan means and between said centrifugal fan means and said filter means, said first baffle means having outwardly extending wall portions which extend outwardly of said centrifugal fan means toward said sidewalls of said primary housing so as to create an airflow space radially of said centrifugal fan means between said first baffle means and said sidewalls of said primary housing, second baffle means disposed radially outwardly of said centrifugal fan means and said first baffle means, said second baffle means having inner surfaces for directing the airflow from said centrifugal fan means inwardly of said primary housing and between said first baffle means and said filter means whereby air being introduced into said housing by said centrifugal fan means will be directed radially outwardly of said centrifugal fan means and guided by said first baffle means towards said second baffle means and thereafter by said second baffle means between said first baffle means and said air filter means.

2. The compact air purification apparatus of claim 1 in which said filter means includes a mounting bracket assembly attached to said sidewalls of said primary housing, a HEPA filter mounted within a filter frame, said filter frame having inlet and exhaust ends and being adjustably mounted to said bracket assembly, said filter frame having a gasket along said inlet end thereof, said gasket being engaged in airtight relationship with said mounting bracket assembly whereby airflow through said primary housing is directed through said HEPA filter.

3. The compact air purification apparatus of claim 1 in which said primary housing includes upper and lower sections, said filter means being mounted within said lower section and said first and second baffle means being carried by said upper section, and means for removably mounting said upper and lower section together.

4. The compact air purification apparatus of claim 1 including prefilter means mounted to said first end of said primary housing and extending across said inlet opening therein, said prefilter means including a second housing having substantially closed sidewall portions and first and second end portions having inlet and discharge openings therein respectively, a selectively removable filter means carried by said second housing, and means for securing said prefilter means to said first end portion of said primary housing so that said discharge opening of said prefilter means is aligned in proximate relationship to said inlet opening in said primary housing.

5. The compact air purification apparatus of claim 4 including a generally conical baffle means mounted through said inlet opening in said primary housing so as to direct air passing therethrough into said centrifugal fan means.

6. The compact air purification apparatus of claim 1 in which said second baffle means includes first and second members disposed on opposite sides of said centrifugal fan means, each of said first and second members being generally C-shaped in cross section, each of said first and second members extending between opposite sides of the sidewalls of said primary housing so as to be in generally parallel relationship with respect to one another.

7. The compact air purification apparatus of claim 6 in which each of said first and second members of said second baffle means extend generally parallel with respect to said first end portion of said primary housing and curve downwardly in relationship with said sidewalls and thereafter inwardly of said sidewalls toward the interior of said primary housing.

8. The compact air purification apparatus of claim 6 in which each of said first and second members of said second baffle means have a base portion and a pair of spaced outwardly extending wall portions, one of said outwardly extending wall portions extending inwardly of said primary housing toward said first end portion thereof and the other of said outwardly extending wall portions extending inwardly of said primary housing and toward said air filter means.

9. The compact air purification apparatus of claim 6 including air diffuser means extending between each of said first and second members of said second baffle means and said first baffle means, each of said air diffuser means having a plurality of openings therethrough so that air passing from said second baffle means toward said air filter means passes through said openings in said air diffuser means.

10. The compact air purification apparatus of claim 6 in which said first baffle means includes plate means which extends generally parallel with said first end portion of said primary housing, an opening generally centrally through said plate means, a generally concave portion mounted within said opening through said plate means, said centrifugal fan means being partially disposed within said concave portion of said plate means, and sound dampening material secured to said first baffle means.

11. The compact air purification apparatus of claim 10 in which said annular sidewall of said concave portion of said first baffle member extends toward said first end portion of said housing a distance generally not greater than two-thirds the height of said blade means.

12. The compact air purification apparatus of claim 4 in which said first baffle member includes a recessed area defined by a plate means having a lower generally planar wall portion, a pair of outwardly extending portions extending upwardly and outwardly from opposite sides of said planar wall portion toward said first end portion of said primary housing and flanged wall portions extending from said outwardly extending portions toward said second baffle means on opposite sides of said centrifugal fan means, and at least one layer of sound dampening material generally covering said plate means of said first baffle means.

13. The compact air purification apparatus of claim 12 in which said first baffle means includes a pair of spaced sidewall means disposed between said outwardly extending portions, and said centrifugal fan means being at least partially disposed within said recessed area defined said first baffle members.

14. The compact air purification apparatus of claim 6 in which said first end portion of said housing is covered by a sound dampening material which extends inwardly of said primary housing.

15. The compact air purification apparatus of claim 14 in which said fan blade means includes first and second ends, said first ends of fan blade means being oriented adjacent said first end portion of said primary hosing, said second ends of said blade means being disposed adjacent said first baffle means, and said first ends of said blade means being disposed so as to be generally coextensive with said sound dampening material which is attached to said first end portion of said primary housing.

16. In a compact air purification apparatus for providing clean airflow to a clean air enclosure including a filter plenum chamber having closed sidewalls, and first and second end walls, an air inlet opening through the first end wall and an air discharge opening through the second end wall, the inlet and discharge openings being generally aligned with the central axis of the plenum chamber in which the improvement comprises a blower unit mounted through the inlet opening, said blower unit including a centrifugal fan rotatably and drivingly mounted to a motor means, said centrifugal fan having a plurality of radially extending blades which are mounted so as direct air passing inwardly through the inlet opening radially outwardly generally perpendicularly with respect to the central axis of the plenum chamber, said centrifugal fan being disposed entirely within the plenum chamber with said blade means extending along their length from adjacent the first end of the plenum chamber toward the second end thereof, a filter means mounted to the sidewalls of the plenum chamber adjacent the second end thereof, a first baffle means mounted within the plenum chamber between said centrifugal fan and said filter means, a pair of second baffle means disposed radially outwardly on opposite sides of said centrifugal fan and within the plenum chamber, said second baffle means having at least one air deflecting surface for directing the air passing radially outwardly from said centrifugal fan inwardly of the plenum chamber and toward said filter means, said first baffle means having wall portions which extend partially between said blades of said centrifugal fan and said second baffle means for preventing air deflected by said second baffle means from impinging on said blades.

17. The compact air purification apparatus of claim 16 in which said second baffle means is attached to the first end wall of the plenum chamber by a plurality of vibration dampening mounting means having first and second ends, said vibration dampening mounting means extending generally parallel with the axis of the plenum chamber, said first ends of said vibration dampening means being secured to the first end of the plenum chamber and said second ends thereof disposed at a point at least one-third of the way along said length of said blades of said centrifugal fan.

18. The compact air purification apparatus of claim 16 in which said wall portions of said first baffle means form a recessed area opening toward said first end wall of the plenum chamber, said blades of said centrifugal fan being partially disposed generally centrally of and between said wall portions and partially within said recessed area of said first baffle means so that at least one-third of the height of said blades extend outwardly of said recessed area toward the first end wall of the plenum chamber.

19. The compact air purification apparatus of claim 18 in which said wall portions of said first baffle means have an upper edge and a flange member extending outwardly from said upper edge toward the sidewalls of the plenum chamber, and sound dampening means secured to said flange means.

20. A compact air purification apparatus for providing clean airflow to a clean air enclosure comprising a housing having upper and lower sections, means for removably connecting said first and second sections in assembled relationship, an air inlet opening through said upper section of said housing and an air discharge opening through said lower section of said housing, a filter means mounted in sealed relationship with said lower section of said housing so that all air passing through said air discharge opening first passes through said filter means, a blower means mounted through said air inlet opening, said blower means having a centrifugal fan mounted inwardly of said housing and adjacent said inlet opening so as to discharge air radially outwardly with respect to said inlet opening, a first air baffle means carried by said upper section of said housing so as to be disposed between said centrifugal fan and said filter means, said first air baffle means including a recessed portion and outwardly extending wall portions, said centrifugal fan being at least partially disposed within said recessed portion of said first air baffle means, second air baffle means carried by said upper section of said housing so as to be oriented radially outwardly and in spaced relationship to said first said baffle means, said second air baffle means having inner surfaces for deflecting airflow from said centrifugal fan inwardly of said housing and between said first air baffle means and said filter means whereby the flow of air will be directed radially outwardly by said centrifugal fan and said first air baffle means toward said second air baffle means and thereafter by said second air baffle means between said first air baffle means and said filter means so that the flow of air is distributed across said air filter means.

21. The compact air purification apparatus of claim 20 including an air diffuser means extending between said first and second air baffle means, said air diffuser means having a plurality of openings therethrough so that the air directed by said second air baffle means is guided through said openings and between said first air baffle means and said filter means.

22. The compact air purfication apparatus of claim 21 in which said second air baffle means includes first and second deflector members which are generally spaced in parallel relationship on opposite sides of said centrifugal fan, said air diffuser means being disposed between each of said first and second deflector members and said first air baffle means.

23. The compact air purification apparatus of claim 22 in which said first and second deflector members are generally C-shaped in cross section and said air diffuser means are generally concavely shaped and extend at least partially below said outwardly extending wall portions of said first air baffle means.

24. The compact air purification apparatus of claim 23 including sound dampening material mounted to said upper section of said housing and extending inwardly thereof adjacent said inlet opening and to said first and second air baffle means.

* * * * *